US 8,040,845 B2

(12) United States Patent
Oulai et al.

(10) Patent No.: US 8,040,845 B2
(45) Date of Patent: Oct. 18, 2011

(54) EFFICIENT ROUTING BETWEEN A MOBILE NODE AND A CORRESPONDENT NODE IN A PROXY MOBILE IP NETWORK

(75) Inventors: Desire Oulai, Longueuil (CA); Suresh Krishnan, Montreal (CA)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 582 days.

(21) Appl. No.: 12/209,938

(22) Filed: Sep. 12, 2008

(65) Prior Publication Data

US 2010/0067446 A1    Mar. 18, 2010

(51) Int. Cl.
*H04W 40/04* (2009.01)
(52) U.S. Cl. ........................... 370/329; 370/401
(58) Field of Classification Search .............. 370/329, 370/331, 338, 401; 455/432.1, 433, 435.1
See application file for complete search history.

(56) References Cited

U.S. PATENT DOCUMENTS

| | | | |
|---|---|---|---|
| 2007/0195791 | A1 | 8/2007 | Bosch et al. |
| 2008/0013493 | A1* | 1/2008 | Wu et al. ................ 370/331 |
| 2008/0137591 | A1* | 6/2008 | Hirano et al. ............ 370/328 |
| 2008/0239963 | A1* | 10/2008 | Brabson ................. 370/235 |
| 2009/0031130 | A1* | 1/2009 | Hirano et al. ............ 713/170 |
| 2009/0268664 | A1* | 10/2009 | Hirano et al. ............ 370/328 |

FOREIGN PATENT DOCUMENTS

| | | |
|---|---|---|
| EP | 1933520 A1 | 6/2008 |
| WO | 2008/104132 A1 | 9/2008 |

OTHER PUBLICATIONS

B. Sarikaya et al., PMIPv6 Route Optimization Protocol, Network Working Group, Internet-Draft, Feb. 11, 2008. pp. 1-23.
PCT Search Report from corresponding application PCT/IB2009/053814.
Sangjin Jeong, Route Optimization for PMIPv6, Apr. 30, 2008.
S. Gundavelli et al., Proxy Mobile IPv6, Network Working Group, RFC 5213, Aug. 2008.
D. Johnson et al., Mobility Support in IPv6, Network Working Group, RFC 3775, Jun. 2004.

* cited by examiner

*Primary Examiner* — Brian Nguyen
(74) *Attorney, Agent, or Firm* — Dilip C. Andrade; Ericsson Canada Inc.

(57) ABSTRACT

Methods and nodes are provided for efficiently establishing a route between a mobile node and a correspondent node in a Proxy Mobile Internet Protocol network. A return routability procedure is used between a local mobility anchor and a media access gateway on one hand, and the correspondent node on the other hand. The procedure is made without involvement from the mobile node. The procedure is such that the correspondent node handles return routability as per standard mobile IP mechanisms. Following this return routability procedure, a binding of an address of the mobile node with an address of the media access gateway is stored in the correspondent node. This binding allows data traffic to flow between the mobile node and the correspondent node without passing through the local mobility anchor.

20 Claims, 5 Drawing Sheets

EFFICIENT ROUTING BETWEEN A MOBILE NODE AND A CORRESPONDENT NODE IN A PROXY MOBILE IP NETWORK

TECHNICAL FIELD

The present invention relates generally to the field of communications and, more specifically, to a system, methods, a media access gateway, and a local mobility anchor, for efficiently routing data between a mobile node and a correspondent node in a Proxy Mobile IP network.

BACKGROUND

Mobile Internet Protocol (IP) is a protocol that provides routing of IP datagrams to a mobile node (MN) as it travels through the Internet. The MN has a home IP address, which is used when the MN is located within a home domain. The home domain provides a subscription and a home address (HoA) to the MN. When the MN is located outside of the home domain, it acquires a care-of address from a visited domain. The MN informs the home domain of the care-of address allocated thereto by the visited domain in a so-called binding process. When a packet or datagram is received in the home domain identifying the HoA as a destination, while the MN is known to be roaming in the visited domain, the home domain forwards the packet towards the MN in a tunnel, with the care-of address as a new destination address. Mobile IP requires that the MN be capable of detecting whether it is located in the home or in a visited network, and acquiring a care-of address.

Figure 1:
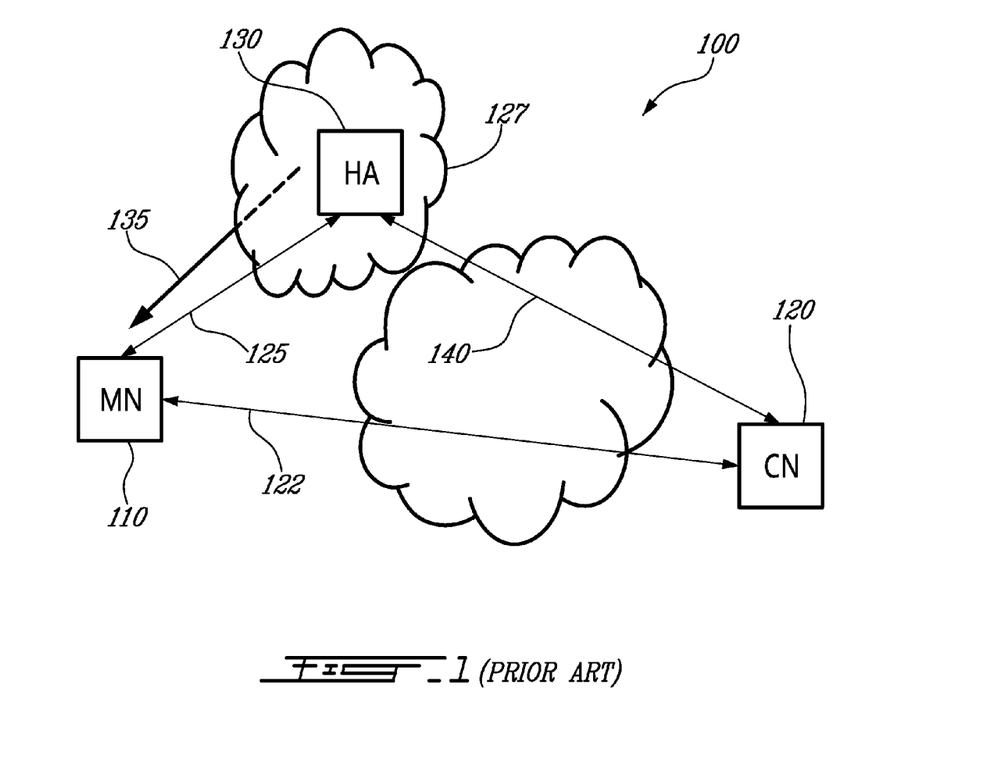
FIG. 1 shows a prior art Mobile IP network.

Using Mobile IP, MNs may connect to other nodes, usually referred to as correspondent nodes (CN). FIG. 1 shows a Mobile IP network architecture as described in the Mobile IP version 6 (MIPv6) specification found in an Internet Engineering Task Force (IETF)'s Request For Comment (RFC) number 3775, entitled "Mobility Support in IPv6", incorporated herein by reference. As can be seen in FIG. 1, an IP network 100 comprises a MN 110 in communication with a CN 120 on a link 122. The link 122 is unlikely to be composed of only one direct physical connection, but rather represents a series of links between routing equipments transparently enabling the communication therebetween. The way the series of links is used to transport traffic between the MN 110 and the CN 120 is irrelevant to the present description, as long as IP communication therebetween can be established.

The MN 110 has a permanently assigned HoA valid in a home network 127, which HoA is allocated upon initialization of the MN 110 in the home network 127. The allocation mechanism is well known in the art. The MN 110 is further in communication with a home agent (HA) 130 located in its home network 127. Among other functionalities, the HA 130 keeps a record of a foreign address of the MN 110 valid outside the home network 127. The foreign address is called care-of-address (CoA) in the context of MIPv6. The CoA assigned to the MN 110 changes in time as the MN 110 moves from one network to another. A record kept by the HA 130, referred to as binding in the context of MIPv6, ties the CoA to the HoA. A binding between the HoA and the CoA is also kept in the CN 120 for the purpose of reaching the MN 110. The HA 130 is also responsible for routing traffic received at the HoA to the MN 110. The received traffic is forwarded by the HA 120 on a link 125 toward the MN 110. It should be noted that the MN 110 may have multiple home and care-of addresses, and that a binding should be kept at the HA 130 for each HoA-CoA pair.

Following now is an example of how the MIPv6 concept applies in a typical situation. For the benefit of the example, the MN 110 is in bidirectional IP communication with the CN 120 on the link 122. When the MN 110 moves from a first network to another, as illustrated by an arrow 135 on FIG. 1, the MN 110 receives a new CoA. This modification in addressing state of the MN 110 must be advertised to the CN 120 and to the HA 130. Prior to the advertisement, the MN 110 must first make sure that the HoA, which did not change, is still valid and that the newly acquired CoA address is usable to communicate with the CN 120. This assessment is done via a return routability (RR) test or procedure. The RR procedure also allows the creation of an authentication key, used to ensure that the advertisement procedure is made under trust between communicating parties. For this purpose, a care-of init cookie and a home init cookie are built by the MN 110, also protecting the RR procedure from being maliciously intercepted or interfered by a third party.

The RR procedure starts at the MN 110, which sends a home test init (HoTI) message through the HA 130, on the link 125, using its HoA as a source address. The HoTI message contains the home test init cookie and is addressed to the CN 120. Upon reception of the HoTI message, the HA 130 forwards it to the CN 120 on a link 140. The link 140 has similar characteristics as the link 122. Simultaneously to sending the HoTI message, the MN 110 sends a care-of test init (CoTI) message containing the care-of init cookie toward the CN 120 on the link 122, with its new CoA as the source address.

Upon reception of the CoTI message, the CN 120 replies with a care-of test (CoT) message addressed to the source address of the CoTI message, which is in the case the new CoA of the MN 110, on the link 122. The CoT message contains the care-of init cookie and a care-of keygen token generated by the CN 120. Upon reception of the HoTI message, the CN 120 replies with a home test (HoT) message addressed to the source address of the HoTI message, which is the HoA of the MN 110, on the link 140. The HoT message contains the home init cookie and a home keygen token generated by the CN 120. Reception of the CoT and HoT messages at the MN 110 successfully completes the RR procedure. The MN 110 keeps the content of both the HoT and CoT messages and then continues with the advertisement of the modification of its CoA toward the CN 120 and the HA 130.

In order to advertise any modification to its CoA, the MN 110 sends a first binding update (BU) message to the HA 130 on the link 125 containing the newly acquired CoA and other information related to the HA 130 binding. The HA 130 then updates its corresponding binding and replies to the MN 110 with a first binding acknowledgment (BA) indicating the successful update of the binding. The MN 110, after sending the first BU, uses the care-of keygen token and the home keygen token received earlier from the CN 120 to generate an authentication key valid between the MN 110 and the CN. The authentication key is commonly referred to as binding management key ($K_{bm}$) in the context of MIPv6. The MN 110 then creates a second BU similar to the first BU, signs it with the authentication key and sends it to the CN 120 on the link 122. The CN 120, upon reception of the second BU or before, generates the same authentication key using the tokens it already generated and further verifies the received second BU before updating its own related bindings. The CN 120 then creates a second BA, signs it using the authentication key and sends it, in accordance with the MIPv6 specification, on the link 122, addressed to the MN 110. Reception of the second BA at the MN 110 indicates the successful completion of the advertisement of the modification.

Many devices, such as laptops or personal assistants, may be moved by their users, but do not have the above described capabilities. Alternatively, the user of a mobile device may elect to disable its Mobile IP capability, for example to reduce signaling on a wireless link between the mobile device and an access point of a visited domain.

Proxy Mobile IP (PMIP) provides mobility capabilities to MNs that do not support mobility as defined in the MIPv6 specification. With PMIP, the MN does not need to support any mobility related signaling. Mobility features are solely supported by the network. The care-of address that was assigned by a visited network to the MN, in Mobile IP, is replaced in PMIP by a proxy care-of address (pCoA). The pCoA is the address of a gateway that provides connectivity to the MN. A description of PMIP is made in RFC 5213, entitled "Proxy Mobile IPv6", from the IETF, incorporated herein by reference.

Figure 2:
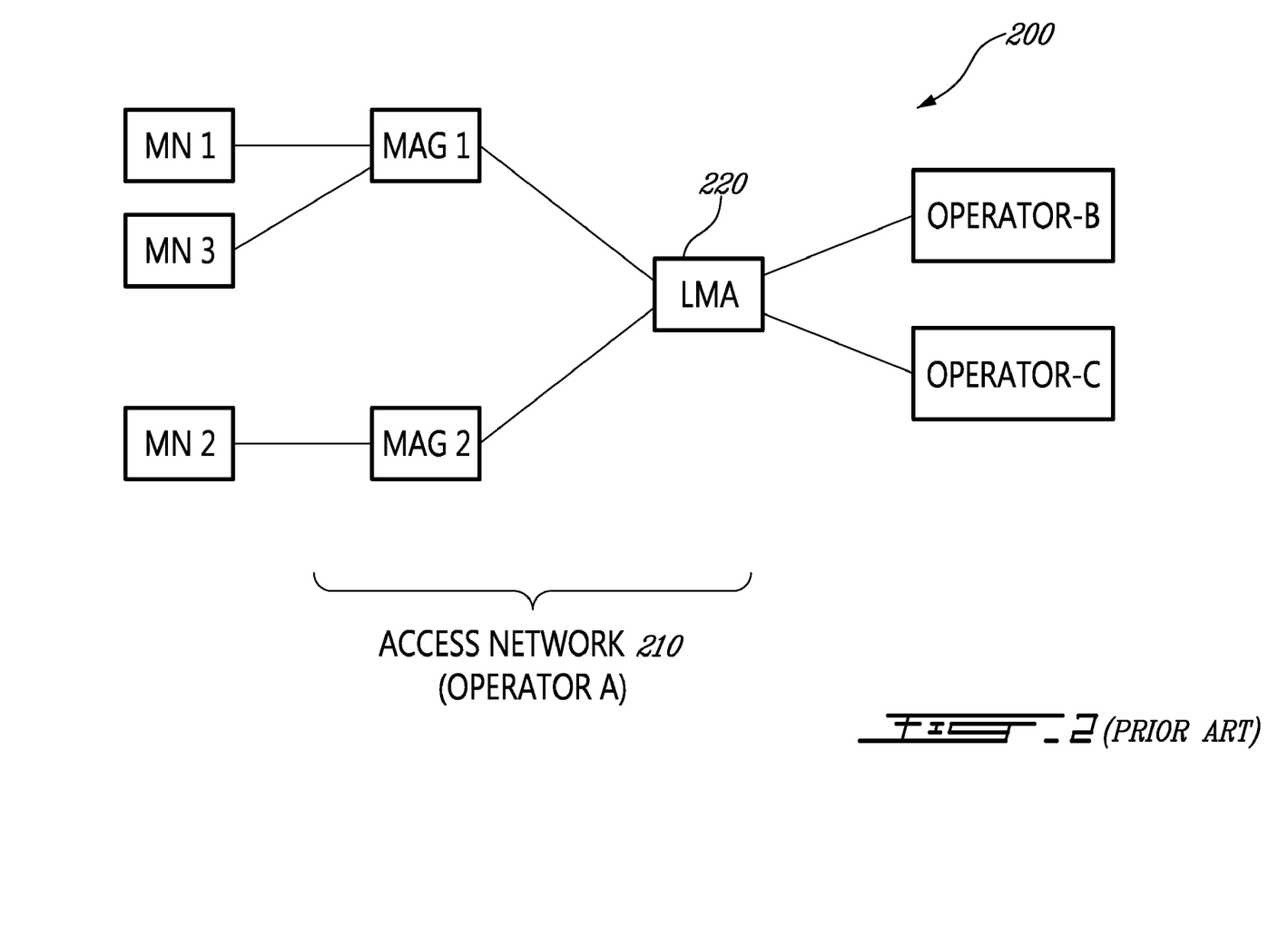
FIG. 2 shows a prior art Proxy Mobile IP network.

FIG. 2 (Prior Art) shows a Proxy Mobile IP (PMIP) network 200, consistent with PMIP RFC 5213. The network 200 comprises three subnetworks owned by three distinct operators A, B and C. An access network 210 of operator A comprises a local mobility anchor (LMA) 220, sometimes called local mobility agent, and two media access gateways (MAG) MAG1 and MAG2, which are also sometimes referred to as proxy mobile agents. The LMA and MAGs provide PMIP support to MNs. Mobile nodes, for example MN1, MN3 and MN2, are subscribed in the subnetworks of operators B and/or C, but are currently located within the access network 210 of operator A. The LMA is used within operator A's subnetwork to manage local mobility. In an exemplary fashion, MN1 and MN3 are connected to MAG1 and MN2 is connected to MAG2. The MNs may be connected to the MAGs directly or through access points (not shown), which may be wireless access points. Of course, those skilled in the art will recognize that the subnetworks of each operator may comprise a plurality of MAGs and LMAs. Also, the subnetworks would comprise supplementary nodes such as routers, home agents, foreign agents, authentication servers, databases, and the like. Those supplementary nodes are not depicted in FIG. 2 for ease of the description of the problems present in the prior art.

When a given MN attaches to a domain that supports PMIP, it sends an access request, possibly through an access point. The access request arrives at a MAG. The MAG sends information about the access request to the LMA in a Proxy Binding Update (PBU) message. The access request may also be forwarded from the MAG to an authentication server (not shown) for authentication and profile retrieval. The PBU comprises an address of the MAG, called proxy care-of address (pCoA), to be used as a care-of address of the MN. The LMA stores in a binding cache the pCoA with a home network prefix (HNP) of the MN. The LMA replies to the MAG with a proxy binding acknowledgement (PBA) message carrying the HNP of the MN. Having received the PBA, the MAG advertises the HNP on a link to the MN. This makes the MN act as if it was connected on a home link, and the MN uses the HNP to configure for itself a HoA. If the MN is roaming, implying that the LMA is not part of the home domain for the MN, the LMA builds a regional care-of address (rCoA) and sends the rCoA to the home domain of the MN, thereby making the home domain forward traffic intended to the MN as per the Mobile IP protocol. In a first global mobility process, a packet intended for the MN is sent from the home domain through the LMA by use of the rCoA. Then, in a second local mobility process, the LMA encapsulates this packet and tunnels it to the MAG by use of the pCoA. The MAG receives this packet, decapsulates it, and sends it to the MN. Packets originating from the MN are sent through the MAG to the LMA and then to their destination addresses.

The RFC 5213 that defines PMIP requires that all traffic exchanged between the CN and the MN be tunneled between the MAG and the LMA. That specification does not allow any route optimization; in fact, the specification expressly states that the RR procedure defined in the RFC 3775 is not applicable under PMIP. When the MN is in communication with a CN located outside of the MN's PMIP domain, this tunneling is highly inefficient because it neither accounts for the respective locations of the MN and the CN nor benefits from potential high bandwidth links that may be available between the MN and the CN.

SUMMARY

There is currently no support for allowing a mobile node (MN) located in a Proxy Mobile IP (PMIP) network comprising a local mobility anchor (LMA) and one or more mobile access gateways (MAG) to communicate with a correspondent node (CN), which is located outside of the PMIP network, with route optimization, while ensuring that a trusted binding can be established between the MN and the CN, and without modifying the CN for supporting this optimization.

There would be clear advantages of having methods and nodes for securely allowing optimized routing of data and signaling between a MN and a CN. It is therefore a broad object of this invention to provide these methods and nodes.

A first aspect of the present invention is directed a method of establishing a route between a MN and a CN in a PMIP network. The method is started by the sending from a LMA of two messages. One message sent towards the CN is a home test init (HoTI) message. The HoTI comprises a home address (HoA) of the MN. The other message sent by the LMA is a trigger sent to a MAG. Responsive to receiving this trigger, the MAG sends towards the CN a care-of test init (CoTI) message. The CoTI comprises an address of the MAG. The LMA receives a home test (HoT) message from the CN. The HoT comprises a home token, which the LMA forwards to the MAG. The MAG also receives from the CN a care-of test (CoT) message comprising a care-of token. Having combined the home token and the care-of token to generate an authentication key, the MAG sends towards the CN a binding update (BU) message for binding the HoA and the address of the MAG, the BU message being signed with the authentication key.

A second aspect of the present invention is directed to a method implemented in a MAG for providing a CN with binding information for a MN located in a PMIP network. The method has a step of receiving from a LMA a trigger. Responsive to receiving the trigger, the MAG sends towards the CN a CoTI message comprising an address of the MAG. In response, the MAG receives from the CN a CoT message comprising a care-of token. The MAG also receives from the LMA a home token. The MAG combines the home token and the care-of token to generate an authentication key. The MAG then sends towards the CN a BU message for binding the HoA and the address of the MAG, the BU message being signed with the authentication key.

A third aspect of the present invention is directed to a method implemented in a LMA for providing a MAG with information required for establishing at a CN a binding of an address of the MAG with a HoA of a MN located in a PMIP network. According to this method, the LMA sends towards the CN a HoTI message comprising the HoA. The LMA receives from the CN a HoT message comprising a home token. The LMA sends towards the MAG the home token and a CoTI trigger.

A fourth aspect of the present invention is directed to a system for establishing a route between a MN and a CN in a PMIP network. The system comprises a LMA and a MAG. The LMA is capable of sending towards the CN a HoTI message comprising a HoA of the MN. The LMA also sends towards the MAG a trigger, receives from the CN a HoT message comprising a home token, and forwards towards the MAG the home token. The MAG is capable of, responsive to receiving the trigger, sending towards the CN a CoTI message comprising an address of the MAG. The MAG also receives the home token, receives from the CN a CoT message comprising a care-of token, combines the home token and the care-of token to generate an authentication key, and sends towards the CN a BU message for binding the HoA and the address of the MAG, the BU message being signed with the authentication key.

A fifth aspect of the present invention is directed to a MAG for providing a CN with binding information for a MN located in a PMIP network. The MAG comprises an interface configured to communicate with the MN, with the CN and with a LMA, and a controller. The controller controls the interface. The controller further receives from the LMA a trigger. Following reception of the trigger, the controller sends towards the CN a CoTI message comprising an address of the MAG. The controller receives from the CN a CoT message comprising a care-of token. It also receives from the LMA a home token. Combination of the home token and of the care-of token is made at the controller in order to generate an authentication key. The controller finally sends send towards the CN a BU message for binding the HoA and the address of the MAG, the BU message being signed by the controller with the authentication key.

A sixth aspect of the present invention is directed to a LMA for providing a MAG with information required for establishing at a CN a binding of an address of the MAG with a HoA of a MN located in a PMIP network. The LMA comprises an interface configured to communicate with the MAG and with the CN, and a controller. The controller controls the interface. The controller further sends send towards the CN a HoTI message comprising the HoA. In response, the controller receives from the CN a HoT message comprising a home token. The controller also sends towards the MAG the home token and a CoTI trigger.

BRIEF DESCRIPTION OF THE DRAWINGS

For a more detailed understanding of the invention, for further objects and advantages thereof, reference can now be made to the following description, taken in conjunction with the accompanying drawings, in which.

DETAILED DESCRIPTION

The innovative teachings of the present invention will be described with particular reference to various exemplary uses and aspects of the preferred embodiment. However, it should be understood that this embodiment provides only a few examples of the many advantageous uses of the innovative teachings of the invention. In general, statements made in the specification of the present application do not necessarily limit any of the various claimed aspects of the present invention. Moreover, some statements may apply to some inventive features but not to others. In the description of the figures, like numerals represent like elements of the invention.

The present invention provides methods and nodes for efficiently routing data between a mobile node and a correspondent node in a Proxy Mobile IP (PMIP) network. PMIP is defined in the RFC 5213 from the IETF. The invention allows a mobile node (MN) located in a modified PMIP network comprising a modified local mobility anchor (LMA) and one or more modified mobile access gateway (MAG) to communicate on an optimized route with a correspondent node (CN), which is located outside of the PMIP network. A route between the MN and the CN is optimized because data exchanged between these two nodes does not need to pass through the LMA. This is accomplished by (i) the LMA handling some part of the route optimization process, (ii) the LMA sending a message to the MAG for triggering another part of the route optimization process, and (iii) stopping all route optimization signaling at the MAG, thereby blocking this signaling from reaching the MN. The process is triggered from the LMA because this node generally handles policies related to services offered to the MN by the PMIP network. Testing a home address of the MN is done from the LMA. Testing of an address of the MAG, used as a proxy care-of address for the MN, is done from the MAG in order to verify routability between the CN and the MAG. In the prior art, for Mobile IP version 6 (MIPv6) as defined in the RFC 3775 from the IETF, the route optimization signaling (CoTI and HoTI messages) would have been sent from the mobile node. The CN receives and responds to conventional MIPv6 route optimization and binding update messages, these messages being conventional except for address values contained within. Hence, a MIPv6 compliant CN does not need to be modified to communicate with the PMIP network of the present invention, as only the MAG and the LMA are impacted.

In the context of the present invention, a mobile node may comprise a mobile cellular telephone, a digital personal assistant, a laptop computer, an IP television apparatus, a gaming device, a server, and the like. The mobile node may be connected to the media access gateway through either a wired or wireless connection, being connected to the media access gateway either directly or through an access point. The mobile node is capable of IP communication, but does not need to support MIPv6 capabilities. Alternatively, the mobile node may be capable of supporting MIPv6, and may further comprise means to turn off such capabilities, as using PMIP may sometimes be more economical on the mobile node power, processing and transmission resources. The correspondent node may be another mobile node, or a node of any other type, capable of IP communication. The local mobility anchor and the media access gateway generally comprise features defined in the prior art PMIP specifications, but also comprise added features as described in relation with the present invention.

Figure 3:
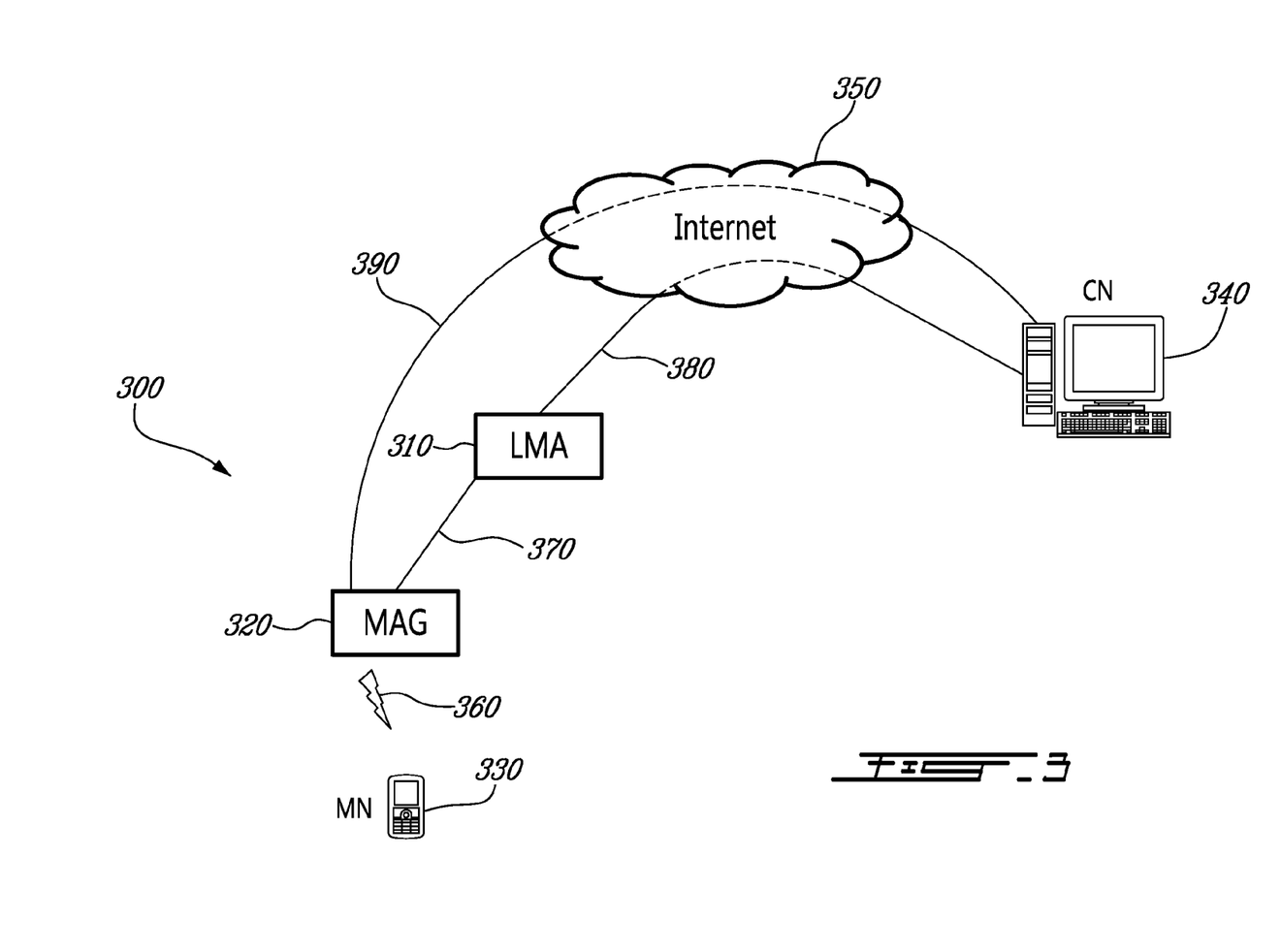
FIG. 3 shows an exemplary Proxy Mobile IP network modified as per some teachings of the present invention.

Reference is now made to the Drawings, in which FIG. 3 shows an exemplary Proxy Mobile IP network modified as per some teachings of the present invention. The PMIP network 300 of the present invention forms a system comprising a LMA 310 and a MAG 320. The PMIP network 300 provides service to, typically, a large number of mobile nodes such as MN 330. The LMA 310 is connected to the Internet 350, not part of the PMIP network 300, and allows the MN 330 to communicate with CN 340, which may also be located outside of the PMIP network 300. The PMIP network 300 typically comprises a plurality of LMAs and, generally, an even larger number of MAGS. Only one LMA and one MAG are depicted on FIG. 3 for ease of illustration of the present invention. Likewise, only one MN and one CN are shown for clarity purposes.

Various links 360-390 are shown on FIG. 3. The link 360 is used to connect the MN 330 to the MAG 320. While the link 360 is shown as a wireless link, it could also be embodied as a wired link using a coaxial cable, an optical fiber, a category 5 cable, and the like. A wired or wireless access point (not shown) may be present on the link 360 between the MN 330 and the MAG 320. The MN 330 gets access and registers to the PMIP network 300 on the link 360. The link 370 connects the MAG 320 and the LMA 310. Any number of routers (not shown) may be present and part of the link 370. When a first data packet originating at the MN 330 and destined to the CN 340, arrives at the MAG 320, the MAG 320 tunnels that data packet towards the LMA 310 on the link 370, for forwarding towards the CN 340. The LMA 310 is connected to the CN 340 by use of the link 380, which generally passes through the Internet 350. MIPv6 and PMIP signaling, as well as data, may travel over the links 370 and 380. Generally, the MN 330 and the MAG 320 are located in close proximity while the LMA 310 may be more distant. While this is not visible on FIG. 3, the CN 340 may sometimes be physically much closer to the MN 330 than to the LMA 310. As a result, the present invention introduces the link 390, which may also pass through the Internet 350, and which may have a much shorter span, and thereby shorter delays, than a combination of the links 370 and 380. While in prior art PMIP systems, all data packets exchanged between the MN 330 and the CN 340 would flow through the links 360, 370 and 380, per the present invention, links 370 and 380 can be bypassed as subsequent data packets exchanged between the MN 330 and the CN 340 may now flow through the link 390. This is because, as will be described in the following description of FIG. 4, a binding of a home address (HoA) of the MN 330 with an address of the MAG 320 is stored in the CN 340.

Figure 4:
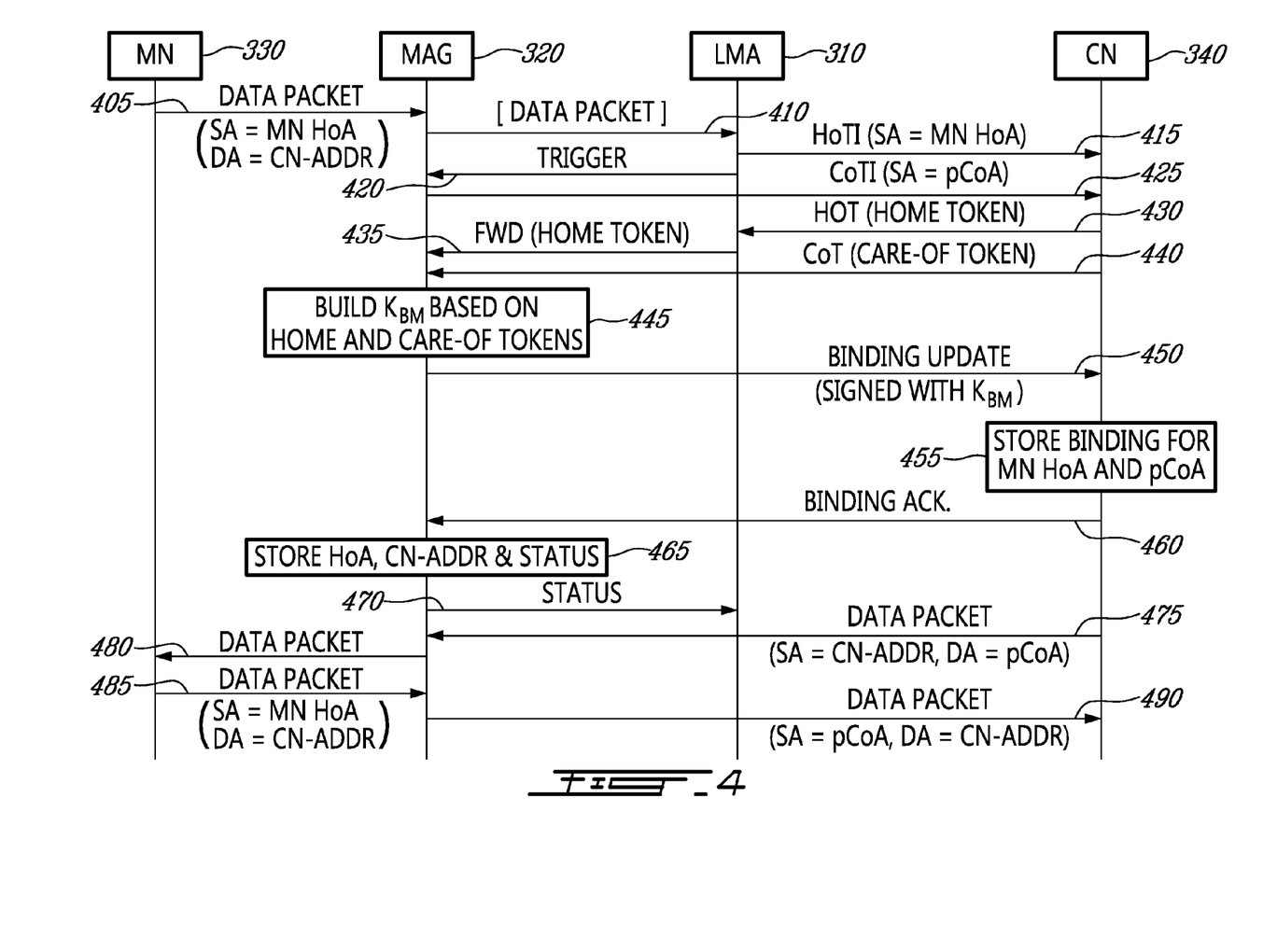
FIG. 4 shows a sequence diagram depicting exemplary steps of the methods of the present invention.

FIG. 4 shows a sequence diagram depicting exemplary steps of the methods of the present invention. The nodes of FIG. 3 are reproduced on FIG. 4. Prior to the beginning of the sequence of FIG. 4, the MN 330 has obtained access on the PMIP network 300 through the MAG 320, a binding of a home network prefix (HNP) of the MN 330 and of an address of the MAG 320 has been stored in the LMA 310, and the HNP has been advertised towards the MN 330, enabling the MN 330 to configure its HoA. The method may start at step 405 when the MN 330 sends a data packet to the MAG 320. The data packet comprises a source address (SA) designating the HoA of the MN 330 and a destination address (DA) designating the CN 340. At step 410, the MAG 320 forwards the data packet, in a PMIP tunnel, towards the LMA 310. The tunneled data packet comprises an outer SA designating the MAG 320 and an outer DA designating the LMA 310. Within the tunnel, the data packet also carries the SA and DA as received at the MAG 320 at step 405, these addresses identifying the MN 330 and the CN 340 respectively.

Per the present invention, the LMA 310 may start a return routability (RR) procedure at step 415 by sending a home test init (HoTI) message comprising the HoA of the MN 330 towards the CN 340. Of course, the LMA 310 may also forward the tunneled data packet towards the CN 340, as in the prior art (step not shown). In response to the HoTI message, the CN 340 sends a home test (HoT) message comprising a home token to the LMA 310 at step 430. The LMA 310 forwards the home token to the MAG 320 at step 435. The home token may be sent to the MAG 320 along with the HoA. Meanwhile, the LMA 310 also sends a trigger to the MAG 320 at step 420. The trigger may also be sent along with the HoA. This trigger leads the MAG 320 to perform a part of the RR procedure by sending towards the CN 340 a care-of address test init (CoTI) message comprising an address of the MAG 320 at step 425. According to the PMIP specification, the address of the MAG 320 is in fact used as a proxy care-of address (pCoA) for the MN 330. In response to the CoTI message, the CN 340 sends a care-of test (CoT) message comprising a care-of token to the MAG 320 at step 440. Having received both the home token and the care-of token, the MAG 320 combines the two tokens to build an authentication key at step 445. The authentication key is sometimes called binding management key ($K_{bm}$). Generation of the $K_{bm}$ is outside the scope of the present invention, but may for example comprise hashing of the two tokens. Then, the MAG 320 sends a binding update (BU) message towards the CN 340 at step 450. The BU comprises both the HoA and the address of the MAG 320, which is the pCoA for the MN 330. The BU is further signed with the $K_{bm}$ in order to provide the CN 340 with confidence that the BU message is legitimate. The CN 340 verifies the signature and stores the binding in a binding cache entry at step 455. It then sends a binding acknowledgement (BA) message towards the MAG 320 at step 460. At step 465, responsive to the BA message, the MAG 320 preferably stores a status to represent the outcome of the binding process. Along with the status, the MAG 320 takes note that the HoA of the MN 330 and the address of the CN 340 may be used for direct communication therebetween. At step 470, the MAG 320 may provide a status message to the LMA 310 in order to relate that the RR and binding processes have been completed.

Thereafter, data flows between the MN 330 and the CN 340 while bypassing the LMA 310. For example, when the CN 340 needs to send a data packet towards the MN 330 at step 475, it directs the packet to the MAG 320, based on the fact that the address of the MAG 320 is the pCoA that was earlier stored in relation to the MN HoA in the binding cache of the CN 340. The data packet sent from the CN 340 comprises a SA designating the CN 340 and a DA designating the MAG 320, the address of the MAG 320 being also used as the pCoA. Per the MIPv6 specification, the HoA of the MN 330 is included in a type 2 routing header within the data packet. The MAG 320 receives the data packet and, having extracted the HoA of the MN 330 from the type 2 routing header, forwards the packet to the MN 330 at step 480.

In the opposite direction, when the MN 330 needs to send a new data packet towards the CN 340, it sends the packet with the address of the CN 340 as a destination address at step 485, in the same manner as for the earlier data packet of step 405. If the MAG 320 has stored the status at step 465, it does not need to tunnel that new data packet through the LMA 310. Instead, the MAG 320 forwards the new data packet received at step 485 directly towards the CN 340 at step 490. In compliance with the MIPv6 specification, the data packet forwarded at step 490 comprises a SA set to the MAG 320 address (the pCoA) and a DA set to the address of the CN 340. The packet also comprises a home address option carrying the HoA of the MN 330. Of course, in the absence of the status stored in the MAG 320, or if the status indicates that the binding process failed, the data packet is forwarded towards the LMA 310, in a PMIP tunnel, as in the prior art, in the same manner as shown at step 410.

Those skilled in the art will notice that the order of some of the steps depicted in FIG. 4 may be altered without departing from the present invention. In alternate embodiments, the LMA 310 could send the HoTI message of step 415 and the trigger of step 420 concurrently. In other embodiments, the forwarded home token of step 435 and the trigger of step 420 could be merged in a single message, requiring the HoTI/HoT process to be completed before the start of the CoTI/CoT process. The sequence as shown on FIG. 4, wherein steps 415 and 420 take place in parallel or with minimal delay, are preferred because they allow the HoTI/HoT and CoTI/CoT processes to operate in parallel, providing a quicker response time to the entire process.

Figure 5:
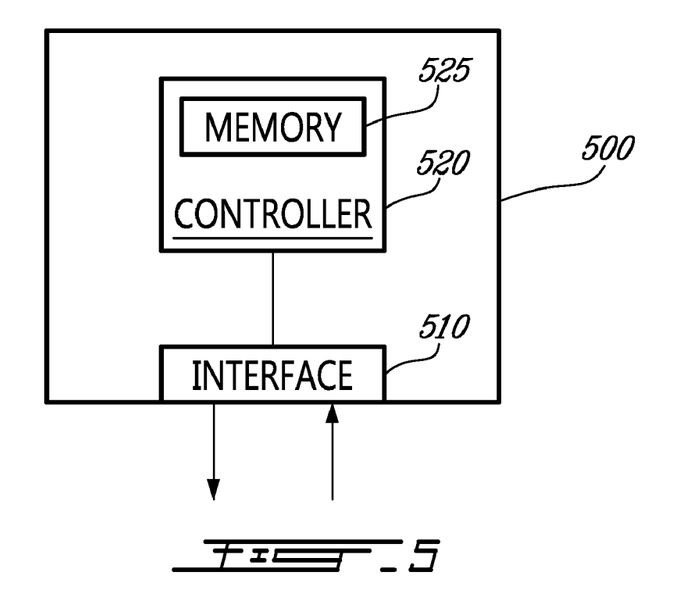
FIG. 5 shows an exemplary media access gateway according to an aspect of the present invention.

An exemplary construction of a MAG will now be described by reference to FIG. 5, which shows an exemplary media access gateway according to an aspect of the present invention. The MAG 500 comprises an interface 510 and a controller 520. The controller 520 may comprise any commercially available, general purpose processor, or may be specifically designed for operation in the MAG 500. The controller 520 may be operable to execute processes related to the present invention in addition to numerous other processes. The controller 520 may further comprise a memory 525. The memory 525 may be a volatile memory, or may alternatively be a non-volatile memory, or persistent memory, that can be electrically erased and reprogrammed and that may be implemented, for example, as a flash memory or as a data storage module. The interface 510 may be implemented as one single device or as distinct devices for receiving and sending signaling, messages and data. The MAG 500 is connected towards one or more LMAs and to a plurality of MNs; means for connecting the MAG 500 towards other nodes may vary as, for example, connection towards one LMA might be on an Ethernet link while connection towards a MN might be on a wireless link. Therefore the interface 510 may comprise a plurality of devices for connecting on a plurality of links of different types. Only one generic interface 510 is illustrated for ease of presentation of the present invention. The MAG 500 may further act as a router and may thus comprise many more components, as is well-known in the art.

The MAG 500 of the present invention is used for providing a CN with binding information for a MN located in a PMIP network. The controller 520 controls the interface 510. Signals and messages arriving at the interface 510 are forwarded to the controller 520 for analysis. When the controller 520 needs to send a signal or message, it generates the signal or message and instructs the interface 510 to put it on a link towards its destination.

The controller 520 receives a trigger which has been originated from a LMA. Following reception of the trigger, the controller 520 sends towards the CN a CoTI message comprising an address of the MAG 500. The controller 520 receives from the CN a CoT message comprising a care-of token. It also receives from the LMA a home token. Combination of the home token and of the care-of token is made at the controller 520, for example by hashing the home token and the care-of token, in order to generate an authentication key. The controller 520 then sends towards the CN a BU message for binding a HoA of the MN and the address of the MAG 500, the BU message being signed by the controller 520 with the authentication key. Thereafter, the controller 520 receives from the CN a BA message acknowledging the binding of the HoA of the MN and of the address of the MAG 500. The memory 525 within the controller 520 permanently stores the address of the MAG 500 and may further store the HoA of the MN, the home token and the care-of token. The memory 525 also preferably stores a status indicating that the HoA of the MN and the address of the MAG 500 have been stored in a binding in the CN, as indicated in the BA message.

The MAG 500 of the present invention may further be used for transiting packets between the MN and CN while bypassing the LMA of the PMIP network. The controller 520 may receive from the CN a data packet intended for the MN, the data packet having not passed through the LMA. The controller 520 extracts from a type 2 routing header present in the data packet the HoA of the MN and forwards the data packet to the MN. The controller 520 may also receive another data packet from the MN, that data packet having a destination address designating the CN. If the memory 525 has stored a status for this purpose, the controller 520 determines that the data packet may be forwarded directly to the address of the CN, without passing through a tunnel towards the LMA. The controller 520 adds to the data packet a home address option carrying the HoA of the MN and then forwards the data packet towards the CN.

Figure 6:
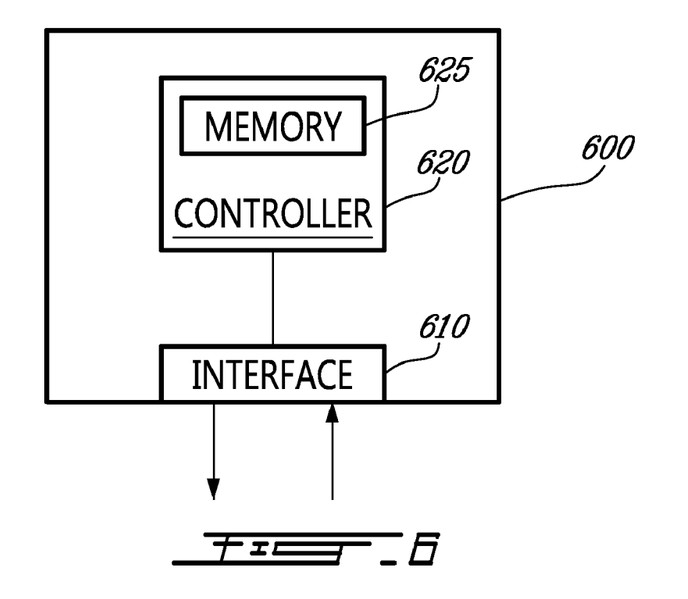
FIG. 6 shows an exemplary local mobility anchor according to an aspect of the present invention.

An exemplary construction of a LMA will now be described by reference to FIG. 6, which shows an exemplary local mobility anchor according to an aspect of the present invention. The LMA 600 comprises an interface 610 and a controller 620. The controller 620 may comprise any commercially available, general purpose processor, or may be specifically designed for operation in the LMA 600. The controller 620 may be operable to execute processes related to the present invention in addition to numerous other processes. The controller 620 may further comprise a memory 625. The memory 625 may be a volatile memory, or may alternatively be a non-volatile memory, or persistent memory, that can be electrically erased and reprogrammed and that may be implemented, for example, as a flash memory or as a data storage module. The interface 610 may be implemented as one single device or as distinct devices for receiving and sending signaling, messages and data. The LMA 600 is connected towards one or more MAGs and, through the Internet, to a plurality of CNs, home networks for the MNs, and the like; means for connecting the LMA 600 towards other nodes may vary as, for example, connection towards one MAG might be on an Ethernet link while connection towards a CN might be on an asynchronous transfer mode (ATM) link. Therefore the interface 610 may comprise a plurality of devices for connecting on a plurality of links of different types. Only one generic interface 610 is illustrated for ease of presentation of the present invention. The LMA 600 may further act as a router and may thus comprise many more components, as is well-known in the art.

The LMA 600 of the present invention is used for providing a MAG with information required for establishing at a CN a binding of an address of the MAG with a HoA of a MN located in a PMIP network. The controller 620 controls the interface 610. Signals and messages arriving at the interface 610 are forwarded to the controller 620 for analysis. When the controller 620 needs to send a signal or message, it generates the signal or message and instructs the interface 610 to put it on a link towards its destination.

The controller 620 sends send towards the CN a HoTI message comprising a HoA for the MN. In response, the controller 620 receives from the CN a HoT message comprising a home token. The controller 620 also sends towards the MAG the home token and a trigger informing the MAG that a CoTI message should be sent therefrom. The trigger may be sent from the controller 620 in parallel with the sending of the HoTI, before sending of the HoTI, or thereafter. In some embodiments, the trigger may be sent at the same time as the home token. The memory 625 within the controller 620 preferably stores a binding of a HNP for the MN with the address of the MAG, in order to facilitate determination of addressing for the trigger and for forwarding the home token, the trigger and the home token being both sent towards the MAG.

Although several aspects of the preferred embodiment of the system, of the methods, of the LMA, and of the MAG of the present invention have been illustrated in the accompanying Drawings and described in the foregoing Detailed Description, it will be understood that the invention is not limited to the embodiments disclosed, but is capable of numerous rearrangements, modifications and substitutions without departing from the teachings of the invention as set forth and defined by the following claims.

The invention claimed is:

1. A method of establishing a route between a mobile node (MN) and a correspondent node (CN) in a proxy mobile internet protocol (PMIP) network, the method comprising the steps of:
   sending from a local mobility anchor (LMA) towards the CN a home test init (HoTI) message comprising a home address (HoA) of the MN;
   sending from the LMA towards a media access gateway (MAG) a trigger;
   responsive to receiving the trigger, sending from the MAG towards the CN a care-of test init (CoTI) message comprising an address of the MAG;
   receiving at the LMA from the CN a home test (HoT) message comprising a home token;
   forwarding from the LMA towards the MAG the home token;
   receiving at the MAG the home token;
   receiving at the MAG from the CN a care-of test (CoT) message comprising a care-of token;
   combining at the MAG the home token and the care-of token to generate an authentication key; and
   sending from the MAG towards the CN a binding update (BU) message for binding the HoA and the address of the MAG, the BU message being signed with the authentication key.

2. The method of claim 1, further comprising the step of:
   receiving at the LMA a data packet originated at the MN prior to the step of sending the HoTI message.

3. The method of claim 2, further comprising the steps of:
   receiving at the MAG from the MN the data packet; and
   forwarding from the MAG towards the LMA the data packet encapsulated in a PMIP tunnel.

4. The method of claim 1, wherein:
   the address of the MAG is used as a proxy care-of address for the MN.

5. The method of claim 1, wherein:
   the trigger and the home token at sent from the LMA in a single message.

6. A method implemented in a media access gateway (MAG) of providing a correspondent node (CN) with binding information for a mobile node (MN) located in a proxy mobile internet protocol (PMIP) network, the method comprising the steps of:
   receiving from a local mobility anchor (LMA) a trigger;
   responsive to receiving the trigger, sending towards the CN a care-of test init (CoTI) message comprising an address of the MAG;
   receiving from the CN a care-of test (CoT) message comprising a care-of token;
   receiving from the LMA a home token;
   combining the home token and the care-of token to generate an authentication key; and
   sending towards the CN a binding update (BU) message comprising the HoA and the address of the MAG, the BU message being signed with the authentication key.

7. The method of claim 6, further comprising the steps of:
   receiving from the CN a binding acknowledgement message (BA); and
   storing a status indicating whether the CN has a binding of the HoA with the address of the MAG.

8. The method of claim 7, further comprising the steps of:
   receiving from the MN a data packet having a destination address designating the CN; and
   conditionally forwarding the data packet towards the CN based on the status.

9. The method of claim 7, further comprising the steps of:
   receiving from the MN a data packet having a destination address designating the CN; and
   forwarding the data packet towards the LMA, in a PMIP tunnel, if the status indicates that no binding is present in the CN.

10. The method of claim 6, further comprising the steps of:
    receiving from the CN a data packet comprising the HoA; and
    forwarding the data packet towards the MN.

11. A method implemented in a local mobility anchor (LMA) of providing a media access gateway (MAG) with information required for establishing at a correspondent node (CN) a binding of an address of the MAG with a home address (HoA) of a mobile node (MN) located in a proxy mobile internet protocol (PMIP) network, the method comprising the steps of:
    sending towards the CN a home test init (HoTI) message comprising the HoA;
    receiving from the CN a home test (HoT) message comprising a home token; and
    sending towards the MAG the home token and a care-of test init (CoTI) trigger.

12. A system for establishing a route between a mobile node (MN) and a correspondent node (CN) in a proxy mobile internet protocol (PMIP) network, the system comprising:
    a local mobility anchor (LMA) being operative to:
       send towards the CN a home test init (HoTI) message comprising a home address (HoA) of the MN,
       send towards a media access gateway (MAG) a trigger,
       receive from the CN a home test (HoT) message comprising a home token, and
       forward towards the MAG the home token; and
    a media access gateway (MAG) being operative to:
       responsive to receiving the trigger, send towards the CN a care-of test init (CoTI) message comprising an address of the MAG,
       receive the home token,
       receive from the CN a care-of test (CoT) message comprising a care-of token,
       combine the home token and the care-of token to generate an authentication key, and
       send towards the CN a binding update (BU) message for binding the HoA and the address of the MAG, the BU message being signed with the authentication key.

13. A media access gateway (MAG) for providing a correspondent node (CN) with binding information for a mobile node (MN) located in a proxy mobile internet protocol (PMIP) network, comprising:
    an interface configured to communicate with the MN, with the CN and with a local mobility anchor (LMA); and
    a controller to control the interface and configured to:
       receive from the LMA a trigger, following reception of the trigger, send towards the CN a care-of test init (CoTI) message comprising an address of the MAG, receive from the CN a care-of test (CoT) message comprising a care-of token, receive from the LMA a home token, combine the home token and the care-of token to generate an authentication key, and send towards the CN a binding update (BU) message comprising a HoA of the MN and the address of the MAG, the BU message being signed with the authentication key.

14. The MAG of claim 13 wherein:
the controller further comprises a memory for storing the HoA.

15. The MAG of claim 14 wherein:
the memory is further for storing the home token and the care-of token.

16. The MAG of claim 14 wherein:
the controller is further configured for receiving from the CN a binding acknowledgement (BA) message; and
the memory is further for storing a status indicating whether the CN has a binding of the HoA with the address of the MAG.

17. The MAG of claim 16 wherein:
the controller is further configured to receive from the MN a data packet and to conditionally forward the data packet towards the CN based on the status.

18. The MAG of claim 13 wherein:
the controller is further configured to receive from the CN a data packet comprising the HoA and to forward the data packet towards the MN.

19. A local mobility anchor (LMA) for providing a media access gateway (MAG) with information required for establishing at a correspondent node (CN) a binding of an address of the MAG with a home address (HoA) of a mobile node (MN) located in a proxy mobile internet protocol (PMIP) network, comprising:

an interface configured to communicate with the MAG and with the CN; and a controller to control the interface and configured to:
send towards the CN a home test init (HoTI) message comprising the HoA,
receive from the CN a home test (HoT) message comprising a home token, and
send towards the MAG the home token and a care-of test init (CoTI) trigger.

20. The LMA of claim 19 wherein:
the controller further comprises a memory for storing in a binding a home network prefix of the MN with the address of the MAG.

* * * * *